United States Patent [19]

Gibbons, deceased

[11] 4,231,398
[45] Nov. 4, 1980

[54] CARGO HOSE TO MARINE TANKER CONNECTION APPARATUS

[75] Inventor: Harold M. Gibbons, deceased, late of Long Beach, Calif., by Gladys M. Gibbons, executrix

[73] Assignee: FMC Corporation, San Jose, Calif.

[21] Appl. No.: 941,699

[22] Filed: Sep. 12, 1978

[51] Int. Cl.³ .................. F16L 27/00; F16L 37/28; B67C 3/34

[52] U.S. Cl. .................. 137/615; 137/614.06; 141/279; 114/230; 285/24

[58] Field of Search .................. 114/230; 9/8 P; 137/615, 614.06; 141/279, 387, 388; 251/149.9; 285/24

[56] References Cited

U.S. PATENT DOCUMENTS

| | | | |
|---|---|---|---|
| 2,018,891 | 1/1958 | Loeser | 141/388 |
| 3,498,325 | 3/1970 | Ashton et al. | 141/387 |
| 3,532,320 | 10/1970 | Fisch | 251/292 |
| 3,695,635 | 10/1972 | Paddington | 285/38 |
| 3,910,609 | 10/1975 | Van der Gagg | 9/8 P |
| 3,921,684 | 11/1975 | Allen | 114/230 |
| 3,979,785 | 9/1976 | Flory | 141/387 |
| 4,079,752 | 3/1978 | Paddington | 137/614.06 |

Primary Examiner—Martin P. Schwadron
Assistant Examiner—A. Michael Chambers
Attorney, Agent, or Firm—Lloyd B. Guernsey; W. William Ritt, Jr.

[57] ABSTRACT

Apparatus for connecting a fluid cargo transfer hose to a marine tanker manifold, comprising a flow control valve and a flanged spool on the end of the hose, and a pipe coupler-valve operator assembly on the tanker manifold. In one embodiment of the invention the pipe coupler-valve operator assembly is mounted on an articulated pipe assembly and supported by a guide structure that facilitates moving the coupler into and out of contact with the spool flange on the end of the hose, and moving the valve operator into and out of engagement with the valve stem, during coupling and uncoupling operations. In another embodiment of the invention the pipe coupler-valve operator assembly is mounted in a fixed position on the tanker manifold, and the flow control valve and flanged spool are brought into coupling position by means of a winch and a guide assembly mounted on the tanker deck.

7 Claims, 17 Drawing Figures

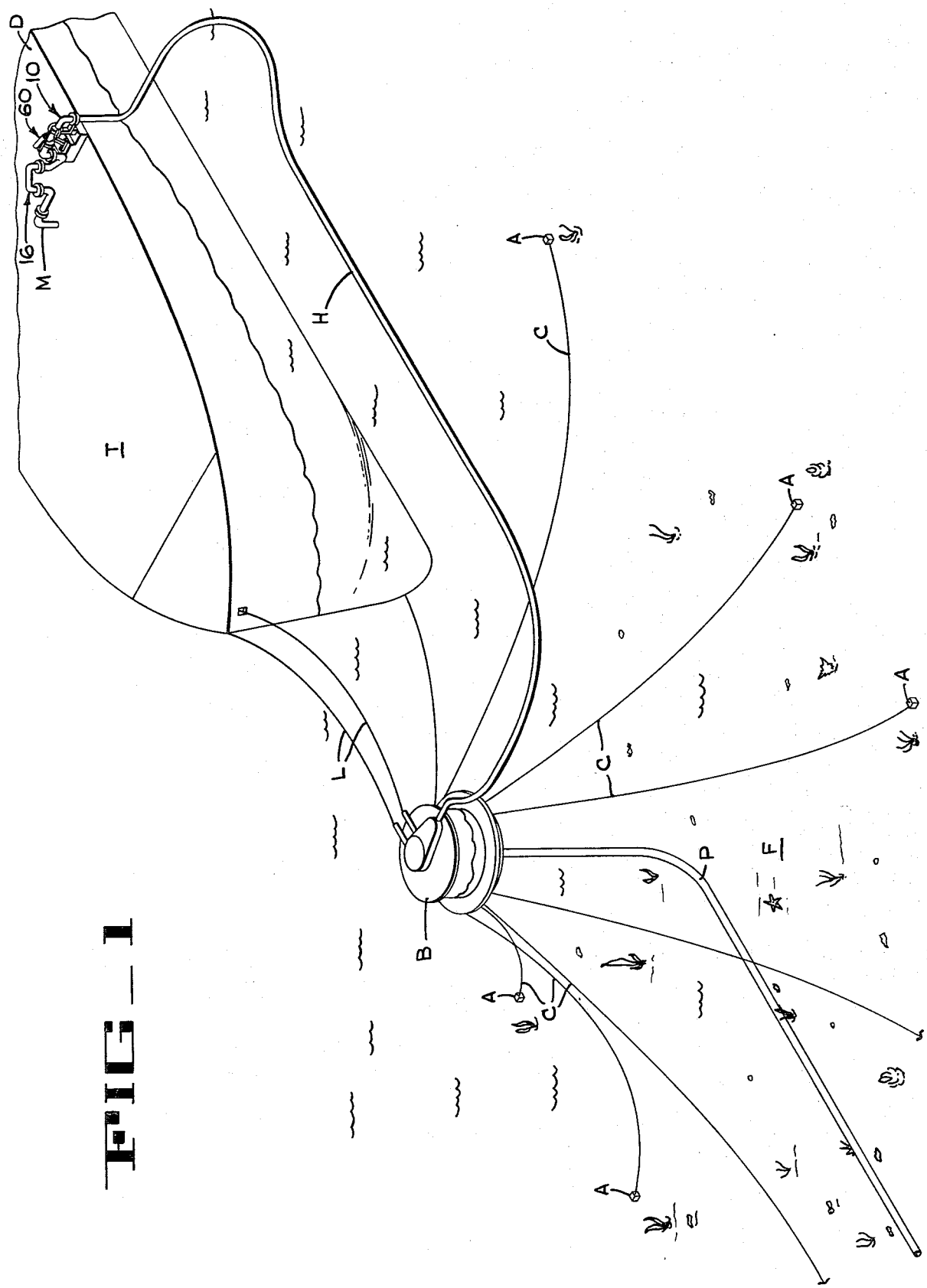

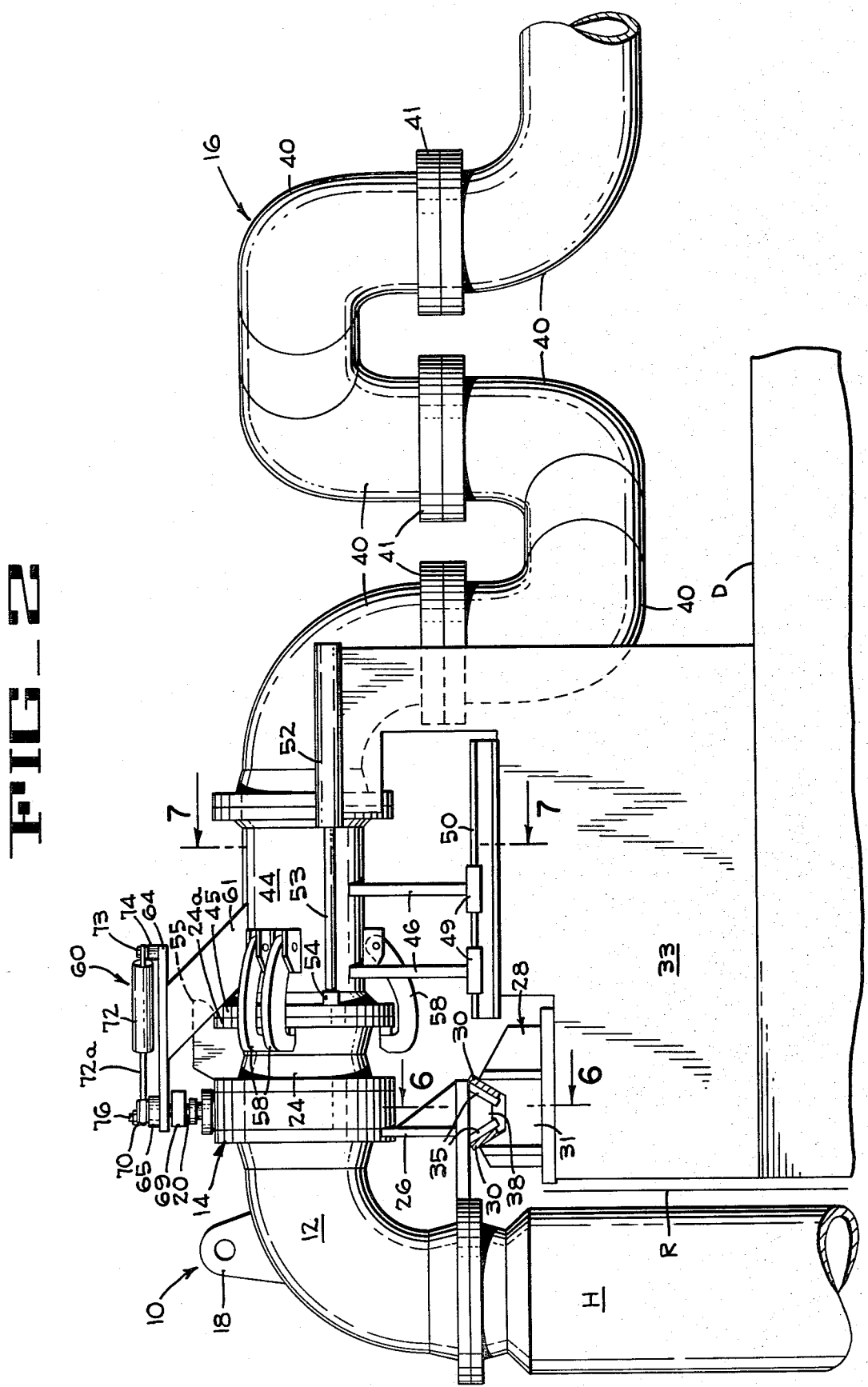

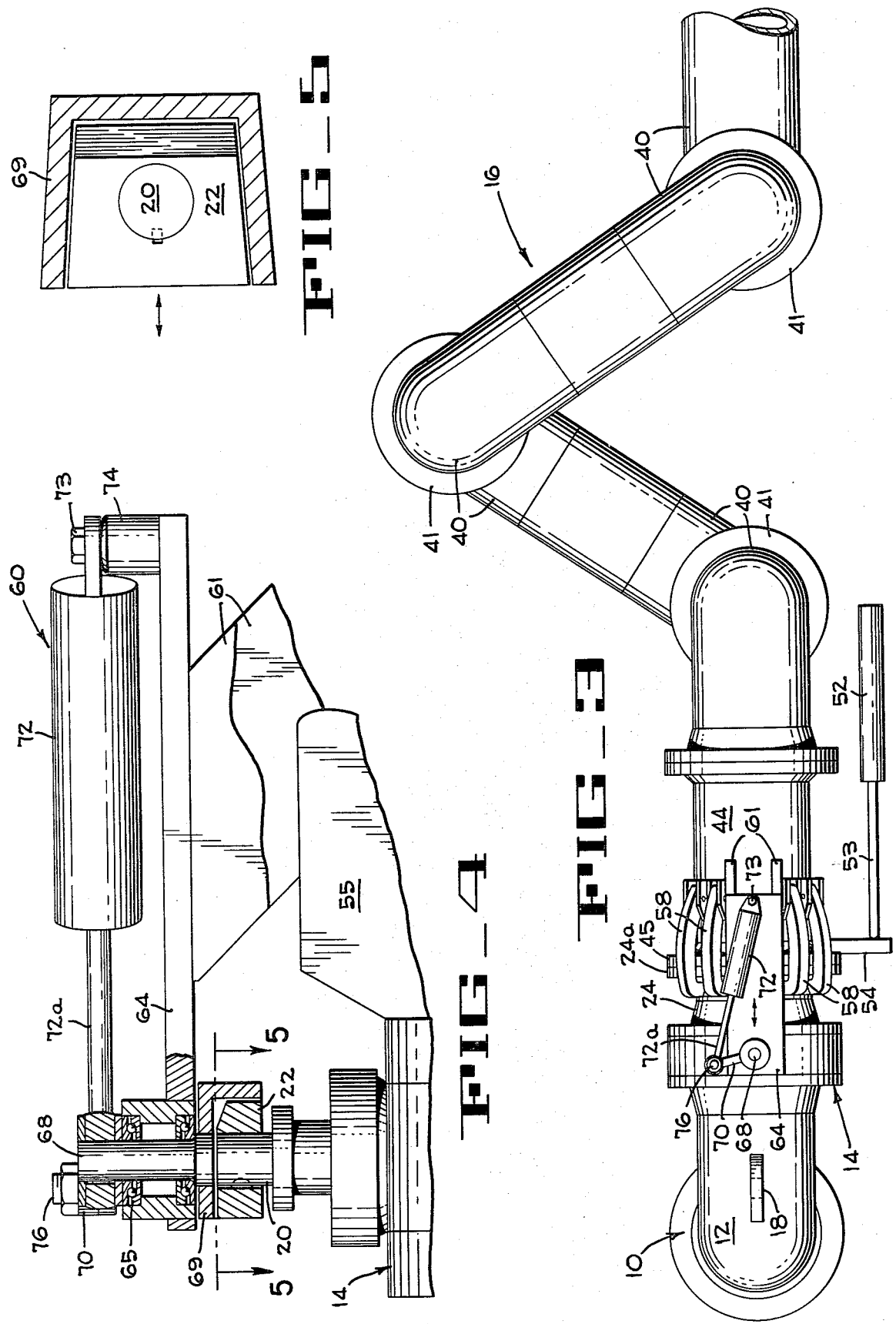

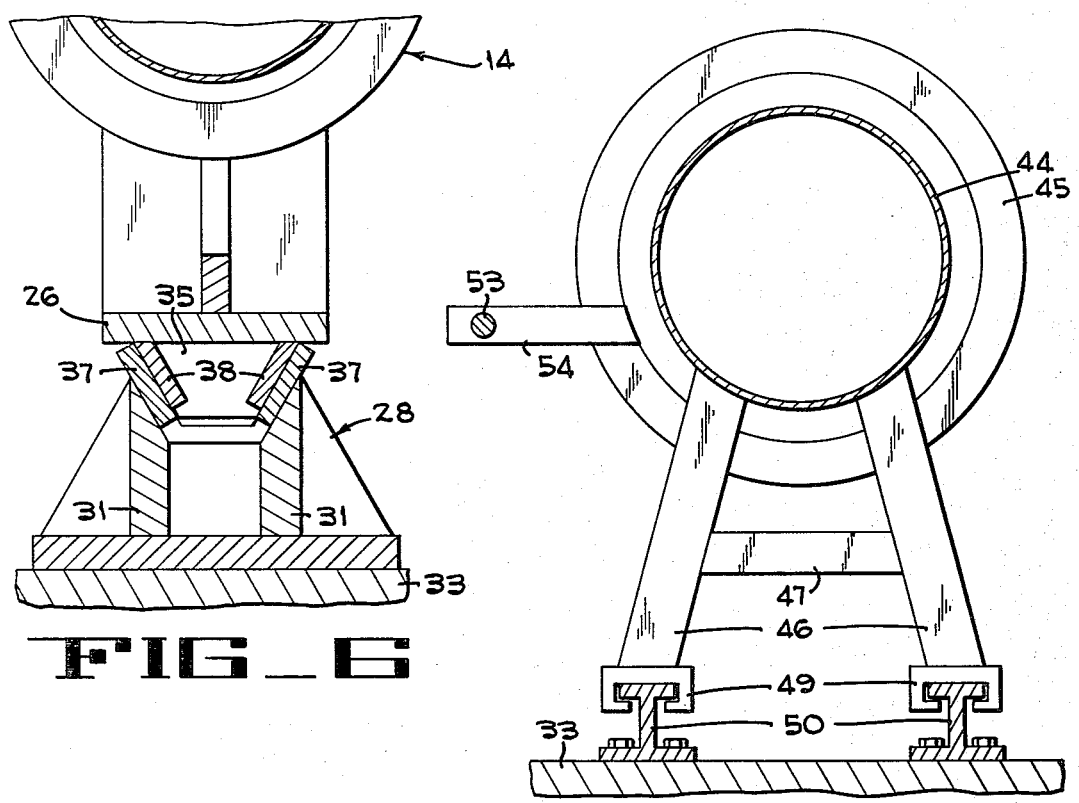
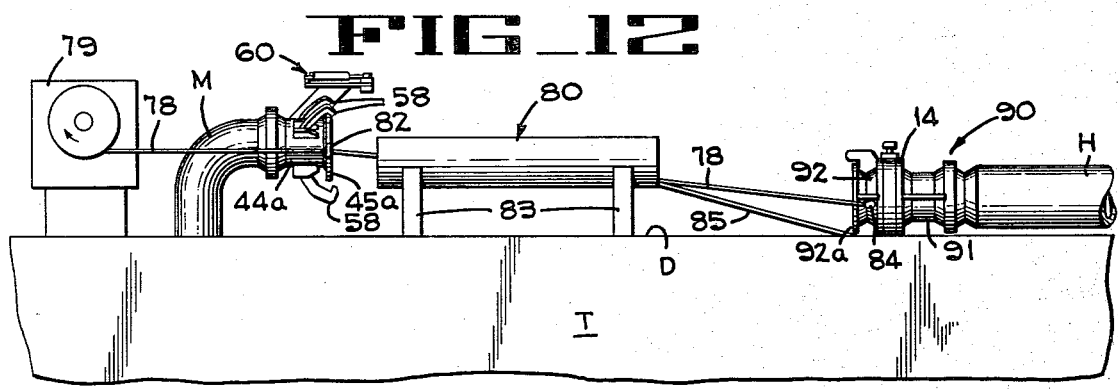
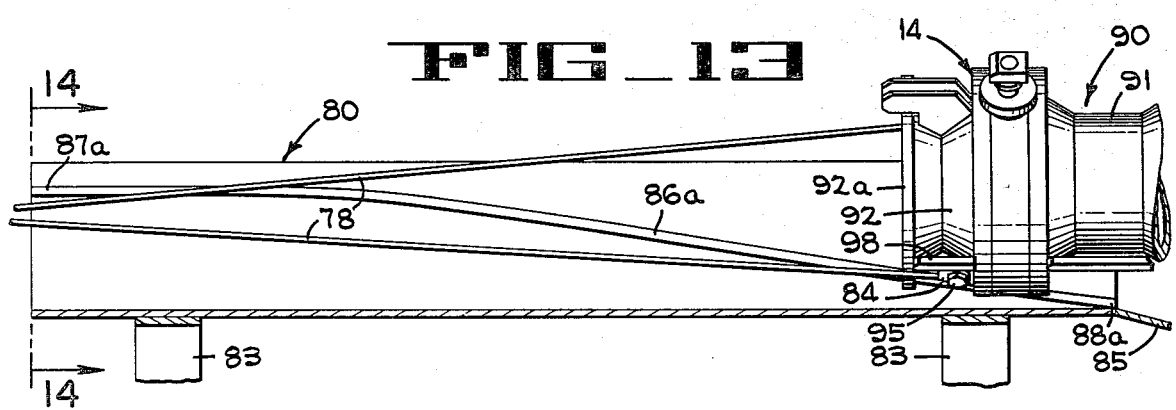

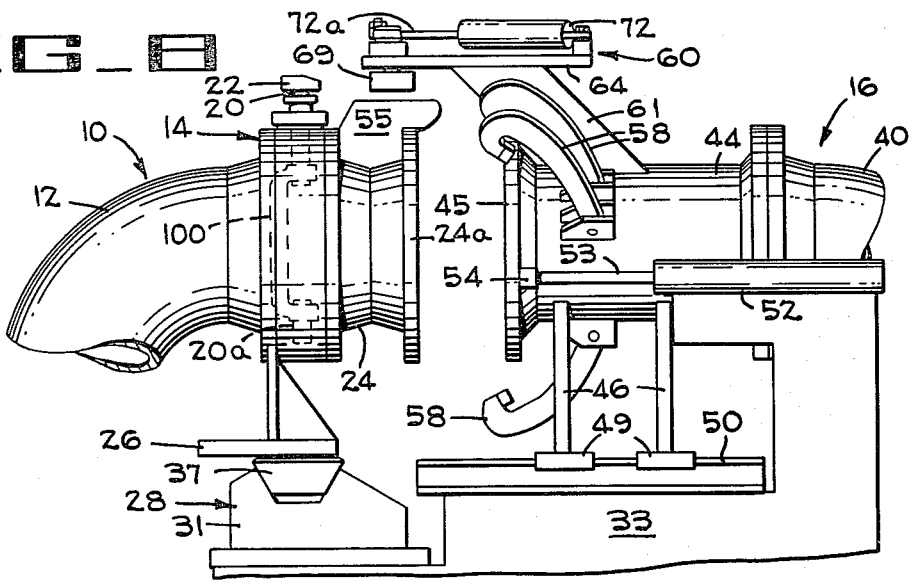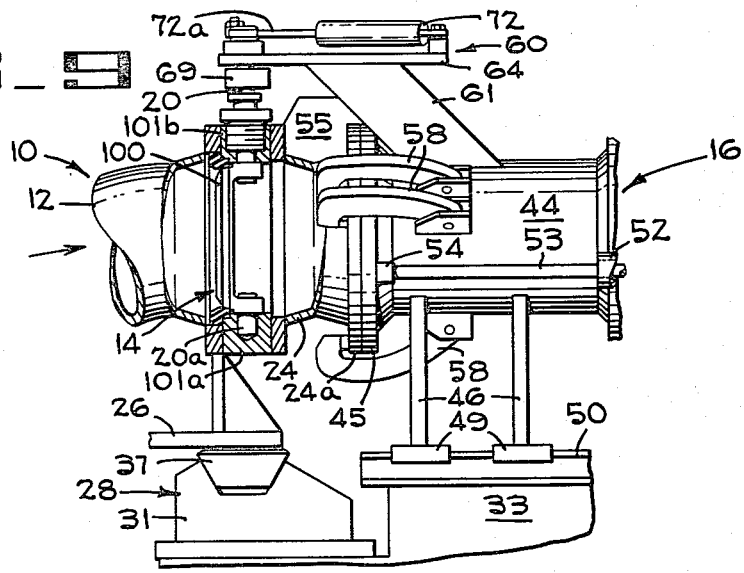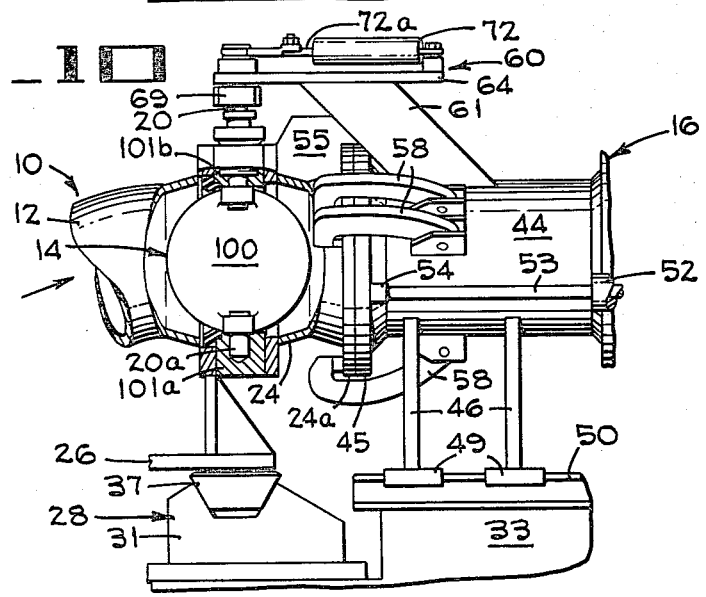

FIG_11

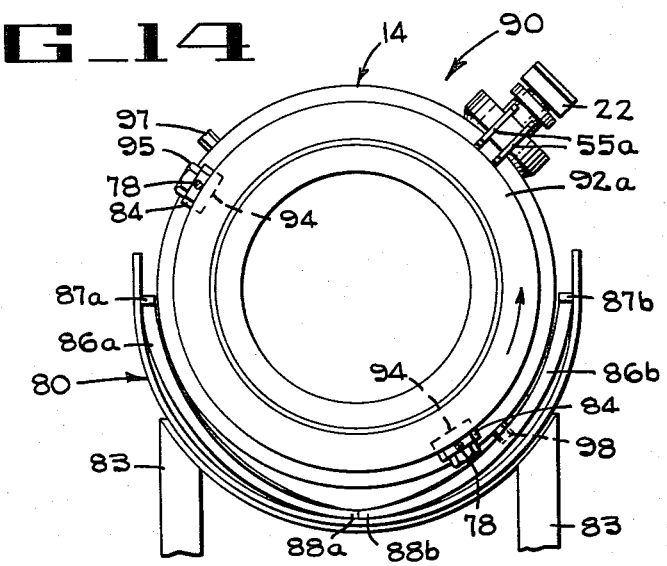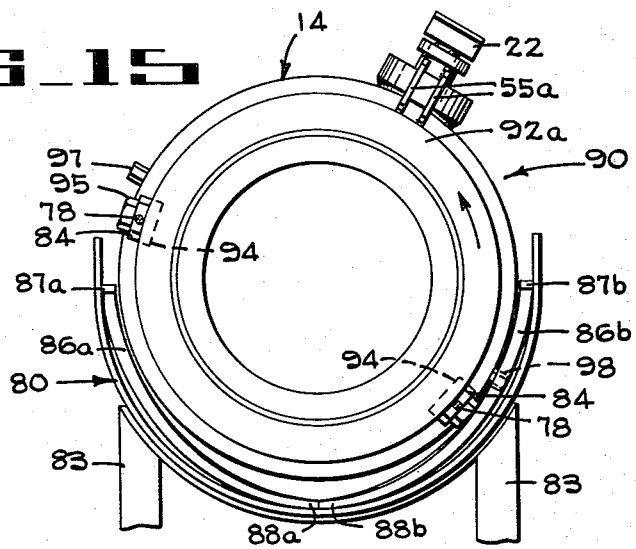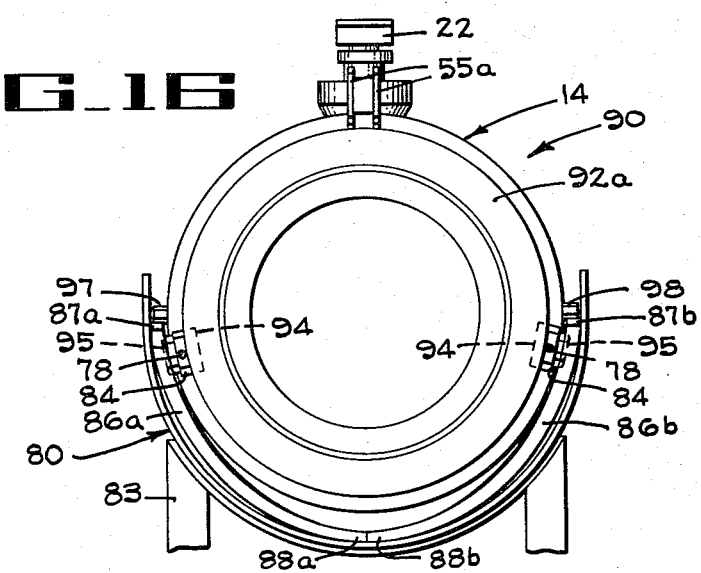

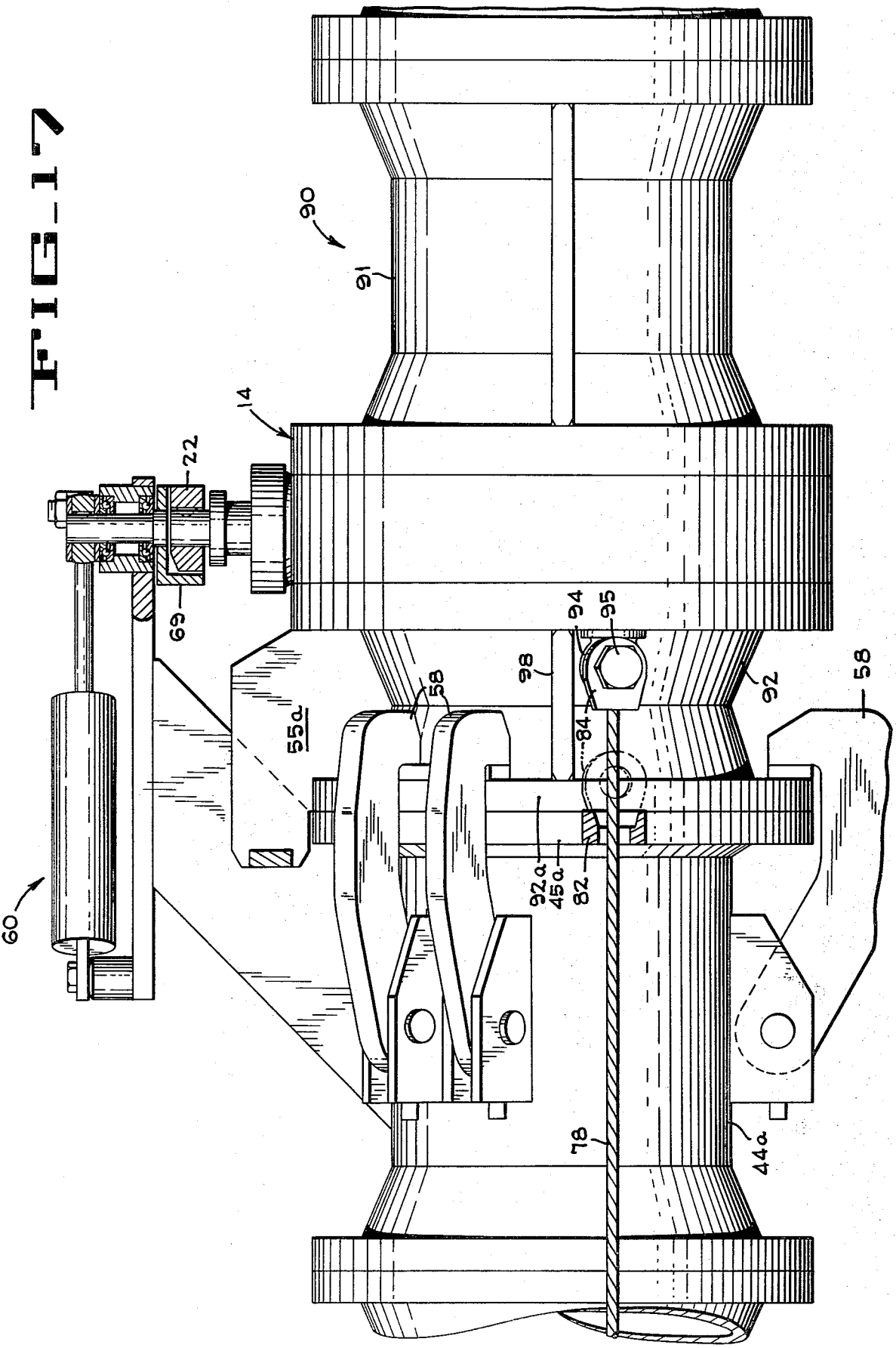

CARGO HOSE TO MARINE TANKER CONNECTION APPARATUS

BACKGROUND OF THE INVENTION

1. Field of the Invention

The present invention relates to fluid handling apparatus, and more particularly to apparatus for connecting a fluid cargo transfer hose to the manifold of a marine tanker.

2. Description of the Prior Art

Various types of fluid transferring devices have been widely used for transferring petroleum or other liquid cargo between a dock or floating barge and a tanker or other marine transport vessel. One apparatus for this purpose, referred to as a marine loading arm, comprises an assembly of large articulated pipe sections that are maneuvered by power equipment to conveniently connect the storage reservoir pipeline on the dock to the manifold of the tanker. With the development of so-called "super-tankers" of huge size and capacity, difficulties have been encountered in providing the necessary port terminals where these vessels can load or discharge their cargoes. Comparatively few ports or harbors are large and/or deep enough to accommodate ships of this size, and it is rarely possible or economical to reconstruct such facilities so that they are adequate for this purpose, especially where the existing installation is relatively primitive and additional space is unavailable.

To overcome this problem, offshore terminals have been built to which a ship can moor or adjacent to which it can anchor. These offshore terminals generally comprise a floating buoy connected to a pipeline system extending along the ocean floor from a storage reservoir, and a large hose connected to the pipeline system at the buoy for transferring the fluid cargo to or from the tanker. After mooring or anchoring procedures are completed the free end of the hose, which is either floating or submerged near the tanker, is picked up by the tanker and connected to its manifold. Because these hoses are large, heavy and quite stiff they are difficult to lift from the water, bend over the rail of the tanker, and secure to the manifold. Such a hose often has a fluid-control valve and an anti-leakage closure cap at its outer end, thereby increasing its weight and the effort that must be exerted in making up the connection between the hose and the manifold.

Previous attempts have been made to reduce the personnel required to carry out the hose-to-manifold connecting operation, including the use of winches to pull the hose towards the manifold, and the use of a short guide chute for guiding the hose in this movement. Many of these earlier proposals are described in United States patents, the more relevant being Marancik U.S. Pat. No. 2,648,201, issued Aug. 11, 1953; Collins U.S. Pat. No. 2,731,800, issued Jan. 24, 1956; Eustace No. 3,773,093, issued Nov. 20, 1973; Whitehouse U.S. Pat. No. 3,844,240, issued Oct. 29, 1974; and Karl et al. U.S. Pat. No. 3,863,590, issued Feb. 4, 1975.

In addition to the elaborate and costly apparatus employed in these earlier systems, they also have the disadvantage of not including a powered actuator for opening and closing the large fluid-control valve at the end of the hose adjacent the tanker manifold. It is very desirable that some type of actuator means for this purpose be included in order to speed up the fluid transfer procedure, and that this actuator means be a part of the tanker's equipment so that deterioration from submergence in salt water is avoided. In order for a powered actuator means to be easily connected and disconnected from the valve, it is necessary that the hose be accurately aligned with the manifold, both axially and rotationally, and this constitutes a difficult task.

SUMMARY OF THE INVENTION

The present invention comprises an apparatus for coupling a fluid cargo transfer hose to a marine tanker manifold, including a powered actuator on the tanker for opening and closing a flow control valve in the hose, and a swift and sure means for connecting and disconnecting the valve and actuator during the hose-to-manifold coupling and uncoupling operation.

In one embodiment of the invention a pipe coupler-valve operator assembly is mounted on the end of an articulated pipe that extends from the tanker manifold, and a guide structure supports and directs this assembly into coupling engagement with a hose spool flange and the stem of a flow control valve both of which are located at the end of the hose and held in position by a guide and support structure.

In another embodiment of the invention, a pipe coupler-valve operator assembly is mounted directly on the tanker's manifold, and a trough-like guide means mounted on the tanker deck guides the spool flange and flow control valve into coupling position as they are pulled by winch means towards the manifold.

Both embodiments further include means to swiftly and surely interconnect the valve operator and the flow control valve stem during the final stage of moving the hose or coupler into coupling position, and power means to actuate the valve operator. Power means are also provided to advance and retract the pipe coupler-valve operator assembly towards and away from the hose in the first embodiment, and to advance the hose to the manifold in the second embodiment.

BRIEF DESCRIPTION OF THE DRAWINGS

FIG. 1 is a diagrammatic isometric view of an offshore fluid transfer terminal, with a cargo hose extending from a floating buoy and connected to a marine tanker's manifold by one embodiment of the present invention, and with a subsea pipeline extending to the buoy from a source of petroleum or other fluid product.

FIG. 2 is an enlarged view in side elevation of the hose-to-manifold connecting means of FIG. 1.

FIG. 3 is a plan view of the apparatus shown in FIG. 2.

FIG. 4 is a side elevation, with portions broken away, of the valve operator assembly of FIGS. 1-3.

FIG. 5 is a horizontal section taken along line 5—5 of FIG. 4.

FIG. 6 is a vertical section taken along line 6—6 of FIG. 2.

FIG. 7 is a vertical section taken along line 7—7 of FIG. 2.

FIG. 8 is a fragmentary side elevation of the apparatus of FIG. 2, showing the valve, in dotted lines, in a closed position and the hose disconnected from the tanker manifold.

FIG. 9 is a view similar to that of FIG. 8 and with portions broken away, showing the hose connected to the tanker manifold.

FIG. 10 is a view similar to that of FIG. 9, showing the valve in an open position.

FIG. 11 is a diagrammatic side elevation of a second embodiment of the invention, including an apparatus that could be used to haul the fluid cargo hose onto the tanker, and an apparatus for pulling and guiding the hose into position for coupling it to the tanker manifold.

FIG. 12 is an enlarged side elevation of the guiding and coupling apparatus of FIG. 11.

FIG. 13 is an enlarged central longitudinal section through the trough-like guide of FIGS. 11 and 12, showing the hose spool flange and valve before they are rotated into alignment with the coupler-valve operator assembly on the tanker manifold.

FIG. 14 is an end elevation taken in the direction of the arrows 14—14 of FIG. 13.

FIG. 15 is a view similar to that of FIG. 14, but showing the spool flange and flow control valve partially rotated toward alignment with the tanker manifold.

FIG. 16 is a view similar to that of FIG. 14, but showing the spool flange and flow control valve in proper alignment with the tanker manifold for coupling thereto.

FIG. 17 is an enlarged fragmentary side elevation partially in section, of the hose and manifold of FIG. 11 in fully connected condition.

DESCRIPTION OF THE PREFERRED EMBODIMENT

Embodiment of FIGS. 1-10

An offshore fluid transfer system employing the cargo hose to marine tanker connection apparatus illustrated in detail in FIGS. 2-10 is diagrammatically represented in FIG. 1. This system comprises a submerged pipeline P extending along the ocean floor F from a storage reservoir or other source of petroleum or other fluid cargo (not shown) to an offshore floating buoy B that functions as a terminal both for mooring and for loading and unloading a marine tanker T. The buoy B is anchored in position by a plurality of chains C that extend between the buoy and a plurality of anchors A that are secured to the ocean floor F. The tanker T is shown secured to the buoy B by a pair of mooring lines L that permit the tanker to swing freely according to the dictates of wind and current, and yet hold the tanker a proper distance from the buoy for loading or unloading through a hose H. The hose H is constructed of material that will float on the surface of the water while fluid cargo is being transferred through it and when not in use the hose H is free to float on the surface of the water where its free end can be grasped and secured to a cable and then hauled aboard the tanker for connection to the tanker manifold M.

One preferred embodiment of the apparatus for connecting a fluid cargo transfer hose to the manifold of a marine tanker of this invention is illustrated in FIGS. 2-10 of the drawings. This particular apparatus has a hose-assembly 10 connected to the free end of the hose H and a pipe coupling 16 connected to a tanker manifold. The hose-assembly includes a pipe elbow 12 (FIGS. 2, 3 and 8-10), connected between the end of the hose H and a butterfly valve 14, to facilitate the moving of the end of the hose-assembly 10 into alignment with the pipe coupling 16 which is connected to the tanker manifold (FIG. 1). A cable (not shown) can be connected to an eye 18 on the elbow 12 and the hose hoisted by a winch (not shown) into the aligned position shown in FIG. 2. In this aligned position the hose H is substantially parallel to the rail line R with the elbow 12 extending over the rail line and into a position above the deck D of the tanker. The butterfly valve 14 is a conventional valve commonly used to control the flow of liquid through fluid transfer hoses and is available from several manufacturers. The valve 14 includes a valve control shaft 20 (FIGS. 2, 4, 5 and 8-10) extending from the top of the valve and having a generally rectangular-shaped knob 22 mounted on the upper end of the shaft 20. The butterfly valve 14 may be changed from a fully open to a fully closed position by rotating the knob 22 a total of 90 degrees. Connected between the butterfly valve 14 and the pipe coupling 16 is a pipe spool 24 (FIGS. 2, 3 and 8-10) having a spool flange 24a which is adapted to be connected to the outboard end of the pipe coupler 16.

The end of the hose H, the elbow 12, the butterfly valve 14 and the pipe spool 24 are held in the position shown in FIG. 2 by a support bracket 26 which is welded or otherwise connected to the lower end of the elbow 12 and by a hose locator 28 which retains the end of the hose-assembly 12 in position for connection to the pipe coupler 16. The hose locator 28 includes a pair of side plates 30 (FIGS. 2 and 8) mounted to form a truncated V-shaped trough. These plates 30 are connected to a pair of support plates 31 (FIGS. 2 and 6) which are mounted on a raised portion and support structure 33 of the deck D. Another pair of plates 35 (FIG. 2) are connected to the support bracket 26 and are positioned to mate with the plates 30 to prevent the end of the hose from moving toward or away from the pipe coupler 16 when the plates are positioned as shown in FIG. 2. A pair of similar plates 37 (FIG. 6) are connected across the ends of the trough to mate with the plates 38 and prevent movement of the support bracket 26 along the length of the trough.

The coupling 16 has one end connected to the tanker manifold (FIG. 1) and is extendable from the tanker manifold to the pipe spool 24 which is connected to the end of the hose assembly 10 as is described hereinbefore. The coupling 16 includes a plurality of 90 degree pipe elbows 40 (FIG. 2) interconnected by a plurality of swivel joints 41 and connected between the manifold and a pipe coupler 44 so that the pipe coupler 44 may be moved into and out of position for coupling to the pipe spool 24. The pipe coupler 44 has a coupler flange 45 secured thereto and is supported by a pair of rigid frame members 46 (FIGS. 2 and 7) which are welded or otherwise connected to the underside of the pipe coupler and by a plurality of cross members 47 (FIG. 7) which provide rigidity for the supporting structure. A pair of cam members 49 are connected to the lower end of each of the rigid frame members 46 and are slidably mounted on a pair of rails 50 (FIGS. 2 and 7). The rails are generally in the shape of an I-beam and are connected to the raised portion 33 of the deck D. The cam members 49 are shaped so that they fit the upper horizontal portion of the I-shaped rail to prevent the cam members from moving off the rails as the tanker pitches and rolls in rough seas.

The power for moving the pipe coupler 44 toward and away from the pipe spool 24 (FIG. 2) is provided by a hydraulic retractor cylinder 52 which is connected between the support structure 33 and the pipe coupler 44. The piston rod 53 of the cylinder 52 is connected to the pipe coupler 44 by a bracket 54 which is welded or otherwise secured to the pipe coupler 44. Suitable hydraulic lines (not shown) connected to the hydraulic cylinder 52 provide fluid pressure to extend or retract the piston rod 53 with respect to the cylinder 52. When the piston rod 53 is extended the pipe coupler flange 45 is moved into contact with the spool flange 24a where the flanges may be clamped together in a coaxial alignment in position to transfer fluid from the hose to the tanker manifold. A pair of guides 55, only one of which is shown in FIG. 2, are connected to the pipe spool 24. These guides aid in aligning the flange 45 with the pipe spool flange 24a as these flanges are moved toward each other.

The pipe coupler 44 includes a plurality of generally hook-shaped clamps 58 (FIGS. 2, 3 and 8-10) which are mounted at spaced positions around the circumference of the end portion of the pipe coupler 44. These clamps secure the pipe coupler 44 in a fluid-tight coaxial alignment with the flanged pipe spool 24. Pipe couplers of the type shown in FIG. 2 are commonly used in the art and the details of these couplers are not considered to be part of this invention. The details of several pipe couplers which are designed for this purpose are disclosed in the U.S. Pat. Nos. 3,473,830 issued Oct. 1969 to Haley and 3,489,434 issued Jan. 1970 to Haley and 3,661,408 issued May 1972 to Gibbons.

The butterfly valve 14 can be opened and closed by a butterfly valve operator 60 which is mounted on the outboard end of the coupler 44 (FIGS. 2-4). The valve operator includes a pair of support brackets 61 which are welded or otherwise connected to the coupler 44 and a horizontal bracket 64 which is connected between the support brackets 61 and a bearing 65. Journaled in the bearing 65 is a shaft 68 having a generally U-shaped element 69 (FIGS. 4 and 5) secured to the lower end. Power to operate the valve operator 60 is provided by a hydraulic cylinder 72 (FIGS. 2-4) having one end thereof connected to the horizontal bracket 64 by a pin 73 and a sleeve 74. The piston rod 72a is connected to the end of a lever 70 by a pin 76 (FIG. 3). FIG. 3 shows the position of the control lever 70 when the element 69 is connected to the knob 22 of the butterfly valve 14 with the valve 14 in the closed position. When the control lever 70 is in this position, approximately at right angles to the length of the pipe spool 24, the element 69 may be moved on to the knob 22 or off the knob 22, in the directions shown by the arrows in FIGS. 3 and 5. For example, when the pipe coupler 44 (FIG. 3) is moved toward the pipe spool 24 the element 69 moves from right to left (FIGS. 3 and 5) into the operating position shown in FIG. 5 with the element 69 around the knob 22. When the element 69 is in operating position the hydraulic cylinder 72 may be energized to pull the rod 72a into the cylinder thereby rotating the shafts 20 and 68 a total of 90 degrees in a clockwise direction to open the butterfly valve 14. When the butterfly valve is in the open position the element 69 cannot be disconnected from the knob 22.

The butterfly valve 14 includes a fluid control disc 100 connected to a pair of shafts 20, 20a which are rotatably mounted in a pair of bearings 101b, 101a (FIGS. 9 and 10) to support the disc in the throat of the valve passageway. When the disc 100 is positioned in the passageway as shown in FIG. 9 the valve is closed and the valve is fully open when the disc 100 is rotated 90° from the closed position into the position shown in FIG. 10.

The procedure for connecting the hose-assembly 10 to the tanker manifold and for opening the butterfly valve is sequentially shown in FIGS. 8-10. Prior to making the connection (FIG. 8) the hook-shaped clamps 58 are in the open position, the hose locator 28 (FIGS. 2 and 8-10) is held securely in position adjacent the tanker's rail R (FIG. 2) by the side plates 30 so that the flange 45 can be moved into a connecting position against the spool flange 24a, and the butterfly valve operator 60 (FIGS. 2 and 8) is disconnected from the knob 22 of the butterfly valve 14.

The pipe coupler 44 is moved along the support rails 50 (FIGS. 2, 8 and 9) into the position shown in FIG. 9 with the flange 45 of the pipe coupler against the spool flange 24a and the valve operator 60 slides into operative engagement with the knob 22 of the butterfly valve 14. The hook-shaped clamps 58 are moved into position to grip the flange 24a and secure the flange 45 into a fluid-tight engagement with the spool flange 24a. The disc 100 must remain in the closed position until after the clamps are in a secure position. As is readily apparent to those skilled in the art, the present invention is adaptable to a system whereby the valve cannot be opened until the clamps 58 are securely closed. This can be done by either hydraulic or mechanical means.

After the flanges 45 and 24a are clamped in a fluid-tight connection the hydraulic cylinder 72 is actuated and the disc 100 is rotated into the open position (FIG. 10) so that fluid may be transferred between the hose H (FIGS. 1 and 2) and the tanker's manifold M (FIG. 1).

Thus, the foregoing invention provides an improved tanker to hose connection having a hose assembly connected to the end of the hose and a coupler flange coupled to the tanker manifold. Power means is provided for moving the coupler relative to the hose-assembly and a guide directs the hose assembly into coaxial alignment with the coupler flange as they move together. A remotely-controlled power-operated fluid-control valve is easily connected to the hose assembly.

Embodiment of FIGS. 11-17

FIGS. 11-17 disclose another embodiment of the present invention wherein a hoist 103 (FIG. 11) is used to lift the end of the hose H out of the water and onto the deck D of the tanker T. The hose is then pulled along the deck and guided into a coupling position adjacent the tanker manifold. The hoist 103 includes an elongated boom 105 having a sheave 106 at the outboard end thereof and a power winch 108 at the inboard end. A hoist cable 109 is connected to the winch 108, threaded over the sheave 106 and connected to a hook 112. In order to lift the hose H from the water, the hook 112 is connected to the eye of a collar 113, which is connected about the hose a short distance from the end, the end of the hose is lifted over the side of the tanker and laid on the deck D. A hose-assembly 90 is then connected to a pair of cables 78 and pulled toward the tanker manifold M (FIG. 11) by a winch 79 while the hose-assembly 90 is guided into alignment with the manifold M by a trough-like guide 80. Several of the parts of the embodiment of FIGS. 11-17 are either identical or similar to the parts of the embodiment of the invention disclosed in FIGS. 1-10 and such identical parts have been labelled with identical numbers while similar parts have been labelled with the suffix "a."

The second embodiment of the invention includes a pipe coupler 44a (FIGS. 11, 12 and 17) which is connected to the tanker manifold M (FIGS. 11 and 12). The coupler 44a is similar to the pipe coupler 44 (FIGS. 2-10) but includes a pair of ears 82 (FIG. 17) (only one of which is shown) mounted on either side of the coupler 44a. Each of these ears 82 includes a bore with one of the cables 78 extending through the bore to act as a guide for the cable while the hose is being pulled toward the pipe coupler 44a. An eye 84 (FIG. 17) is secured to the outboard end of each of the cables 78 for connection to the hose assembly. The hook-shaped clamps 58 and the butterfly valve operator 60 are identical with the corresponding elements as shown and described hereinbefore in the embodiment of FIGS. 2-10.

The trough-like guide 80 (FIGS. 11-16) is supported above the deck D of the tanker T by a plurality of legs 83 which are bolted or otherwise secured to the deck of the tanker (FIGS. 11 and 12). Projecting from the right end of the guide 80 is an inclined slide 85 having an upper cam surface for supporting the end of the hose H as the hose is pulled over the slide toward the pipe coupler 44a by the cables 78 (FIGS. 11-13). A pair of guide rails 86a and 86b for guiding the hose into proper rotational alignment (FIGS. 13-16) are mounted along the inside length of the guide 80. The upper end 87a of the rail 86a and the upper end 87b of the rail 86b are positioned on opposite sides of the guide at the end of the guide 80 nearest the manifold M (FIGS. 12, 13 and 15). As the rails 86a, 86b progress from the left end of the guide (FIGS. 14-16) to the right end of the guide 80, the rails are positioned progressively closer together until the lower ends 88a and 88b of the rails meet at the end of the guide farthest from the tanker manifold M.

Connected to the end of the hose H is the hose-assembly 90 (FIGS. 11, 12 and 17) which includes a first pipe spool 91 connected between the end of the hose H and the butterfly valve 14. A second pipe spool 92 (FIG. 17) having a spool flange 92a at the left end thereof is connected to the butterfly valve 14. A pair of ears 94 (FIGS. 14-17) are welded or otherwise connected to the butterfly valve and each ear is removably connected to a corresponding one of the cable eyes 84 by a bolt 95. A pair of cam projections 97 and 98 (FIGS. 14-17) are connected to extend radially from either side of the spool 92. The cam projections 97 and 98 and the guide rails 86a and 86b serve to rotate the hose-assembly into proper rotational alignment with the pipe coupler 44a as the hose-assembly 90 is pulled through the guide 80 toward the manifold M. For example, when the hose-assembly 90 is slightly clockwise (FIG. 14) (as viewed from the tanker manifold) away from the desired position the projection 98 makes contact with the upper cam surface of the rail 86b as the end assembly 90 is pulled toward the tanker manifold M. This causes the weight of the end assembly to be supported by the projection 98 thereby causing the flexible hose H and the assembly 90 to rotate counterclockwise as the assembly moves from right to left through the guide 80 (FIGS. 12 and 13). This ensures that the knob 22 (FIG. 17) of the butterfly valve 14 of the assembly 90 will be aligned with the U-shaped element 69 on the pipe coupler 44a as the pipe coupler 44a mates with the flange 92a on the pipe spool 92. Details of the operation of the butterfly valve 14 and the butterfly valve operator 69 were discussed hereinbefore in connection with the embodiment of FIGS. 2-7. The rails 86a, 86b and the projections 97, 98 rotate the hose assembly 90 into the position shown in FIG. 16 as the spool flange 92a (FIG. 17) moves into contact with flange 45a of the pipe coupler 44a.

As the flange 92a of the pipe spool 92 approaches the flange 45a of the pipe coupler 44a, the guides 55a (only one of which is shown in FIG. 17) contact the flange 45a and guide the flange 45a into correct axial alignment with the flange 92a. The hook-shaped clamps 58 are then moved into the locked position shown in FIG. 17, by a motor (not shown), to secure the flanges 45a and 92a in a fluid-tight engagement.

Thus, the present invention described herein provides a novel apparatus for connecting a manifold of a tanker to a petroleum-transfer hose in a fluid-tight relationship. The apparatus includes means for guiding the hose into axial alignment with a flange which is connected to the manifold and provides means for remotely controlling a valve means on the hose.

Although the best mode contemplated for carrying out the present invention has been herein shown and described, it will be apparent that modification and variation may be made without departing from what is regarded to be the subject matter of the invention as defined in the appended claims.

What is claimed is:

1. Apparatus for connecting a manifold of a tanker in a coaxial fluid-tight relationship with a petroleum-transfer hose having a hose-assembly mounted on the end thereof, said apparatus comprising:

means for securing said hose in a position substantially vertical along side said tanker; a spool flange connected to one end of said hose assembly; a rigid pipe elbow connected to said hose and including said flange;

a pipe coupler having a coupler flange at one end thereof;

a universal pipe joint;

means for coupling said universal joint between said pipe coupler and said manifold;

a support track for supporting and guiding said pipe coupler as it moves relative to said manifold; the outlet of said pipe elbow being substantially parallel to said support track;

means for moving said pipe coupler along said support track relative to said spool flange and said manifold with said coupler flange being directed into coaxial alignment with said secured spool flange; and means for securing said spool flange to said coupler flange in a fluid-tight connection.

2. Apparatus for connecting as defined in claim 1 including a fluid control valve connected to said hose-assembly, a fluid control valve operator connected to said pipe coupler, and, means for guiding said control valve operator into operating contact with said control valve as said coupler flange is moved into contact with said spool flange.

3. Apparatus for connecting as defined in claim 1 wherein said hose securing means includes a truncated V-shaped trough, means for connecting said trough in a fixed position adjacent said support track, a plurality of support plates, means for connecting said support plates to said hose-assembly to form a connecting trough which mates with said V-shaped trough to secure said hose-assembly in operating position adjacent said support track.

4. Apparatus for connecting as defined in claim 1 wherein said universal pipe joint includes a plurality of pipe elbows, a plurality of swivel joints and means for interconnecting said pipe elbows and said swivel joints.

5. Apparatus for connecting as defined in claim 1 including valve means connected to said hose-assembly, valve control means connected to said pipe coupler and means for guiding said valve control means into operative engagement with said valve means as said spool flange is moved into coaxial engagement with said coupler flange.

6. Apparatus for connecting a manifold of a tanker in a coaxial fluid-tight relationship with a petroleum-transfer hose having a hose-assembly mounted on the end thereof, said apparatus comprising:

means for securing said hose in a substantially vertical position alongside said tanker;

a spool flange connected to the end of said hose-assembly;

a rigid pipe elbow connected to said hose and including said spool flange;

a coupler flange connected to said manifold and a universal pipe joint coupled between said coupler flange and said manifold;

power means for moving said coupler flange relative to said spool flange and said manifold;

guide means for directing said coupler flange into coaxial alignment with said secured spool flange, the outlet of said pipe elbow being substantially parallel to said guide means when said hose is secured to said securing means as said power means moves said coupler flange into engagement with said spool flange;

a valve means;

means for mounting said valve means in said hose-assembly;

a valve operating means;

means for connecting said valve operating means to said coupler flange;

means for slidably connecting said valve operating means to said valve means as said coupler flange moves into engagement with said spool flange; and coupling means for securing said spool flange to said coupler flange in a fluid-tight connection.

7. Apparatus for connecting as defined in claim 6 wherein said universal pipe joint includes a plurality of pipe elbows, a plurality of swivel joints and means for connecting each of said swivel joints between a corresponding pair of said pipe elbows.

* * * * *